Sept. 1, 1970         J. H. LEMELSON         3,526,020

EXTRUSION TECHNIQUES AND APPARATUS

Filed June 11, 1968

INVENTOR.
Jerome H. Lemelson

United States Patent Office 3,526,020
Patented Sept. 1, 1970

3,526,020
EXTRUSION TECHNIQUES AND APPARATUS
Jerome H. Lemelson, 85 Rector St.,
Metuchen, N.J. 08840
Continuation-in-part of application Ser. No. 691,622,
Oct. 2, 1957. This application June 11, 1968, Ser. No. 736,081
Int. Cl. B29d 23/04
U.S. Cl. 18—14
15 Claims

ABSTRACT OF THE DISCLOSURE

An apparatus and method are provided for forming elongated tubular extrusions which vary in shape along their length to facilitate, for example, assembly of sections thereof after they are cut to length. In one form, tubing is extruded and during the extrusion process, or immediately thereafter, the cross sectional shape of the extrusion is varied or changed in a predetermined manner so that portions of the tubing vary in shape from other portions there. Channels or outwardly bulging formations are automatically provided along predetermined lengths of the tubing to facilitate assembly of sections of the extrusion after they are cut to length and, in certain instances, to retain sealing material between assembled sections. In another form, predetermined portions of the exterior and/or interior surfaces of a tubular extrusion are varied in shape to permit cut sections thereof to be easily assembled and retained together.

RELATED APPLICATIONS

This is a continuation-in-part of copending application Ser. No. 373,482, filed June 8, 1964, and having as parent applications Ser. Nos. 142,405, filed Oct. 2, 1961, now U.S. Pat. 3,422,648, and Ser. Nos. 691,622, filed Oct. 2, 1957, now U.S. Pat. Re. 25,570.

SUMMARY OF THE INVENTION

This invention relates to apparatus and methods for operating on extrusions as or immediately after they are formed to shape in a manner to render portions of the extrusion, after they are cut to length from the main extrusion, easily assembleable. In particular, although not necessarily limited thereto, the invention relates to an apparatus for flaring, predetermined portions of the length of an extrusion as it is formed to shape so as to eliminate the need for performing such operations after sections of the extrusion are cut to length.

It is known in the art to form pipe and tubing by extruding a suitable metal or plastic material through a die containing a mandrel which is operative to define the inside wall of the tubing while the wall of the extrusion orifice defines the constant diameter outside wall of the tube. In applying such tubing for the conduction of liquids and gases, it is generally cut to predetermined lengths which are thereafter, upon shipment to the site or location where they are to be utilized, welded or fastened together with tube fittings. The assembly operation requires the welding or bonding of specially made fittings to aligned ends of two or more tubes or one or more of a plurality of operations on the tube ends including such post forming operations as chamfering, flaring, threading or upsetting the material at the ends of the cut lengths of tube. As a result, a substantial amount of labor is required to rehandle, preposition and operate on the cut lengths of tubing before they are conditioned to permit proper assembly into a fluid conducting system. Accordingly, it is a primary object of this invention to provide a new and improved apparatus and method for automatically and continuously operating on an extrusion such as a tube or pipe extrusion, as or immediately after it is formed so as to change its shape along predetermined portions thereof for facilitating assembly of sections of the tube when it is desired to form a piping system thereof.

Another object is to provide an apparatus for predeterminately varying the inside diameter of a tubular extrusion as or immediately after it is formed to shape so as to eliminate the need for effecting such a change in shape at some time thereafter.

Another object is to provide an apparatus for forming a tubular extrusion of rigid material containing portions of the length thereof having resilient material deposited on the rigid material or forming a portion of the wall of the extrusion for serving one or more purposes.

Another object is to provide an improved apparatus and method for extruding tubes and other shapes which vary in cross section along their length, said apparatus being operative also to cut off lengths of the extrusion in a manner such that said variations in cross section are provided at predetermined locations along the length of each cut off section.

Another object is to provide an apparatus and method for deforming thin walled tubing by the use of cooperating dies and a mandrel and the application of fluid pressure to effect the deformation of the wall of the tubing into a cavity defined by the dies.

Another object is to provide a programmable apparatus for variably applying coating or sealant material to selected portions of a pipe or tube as it is fed.

With the above and other such objects in view as may hereafter more full appear, the invention consists of the novel constructions, combinations and arrangements of parts as will be more fully described and illustrated in the accompanying drawings, but it is to be understood that changes, variations and modifications may be resorted to which fall within the scope of the invention as claimed.

Figure 1:
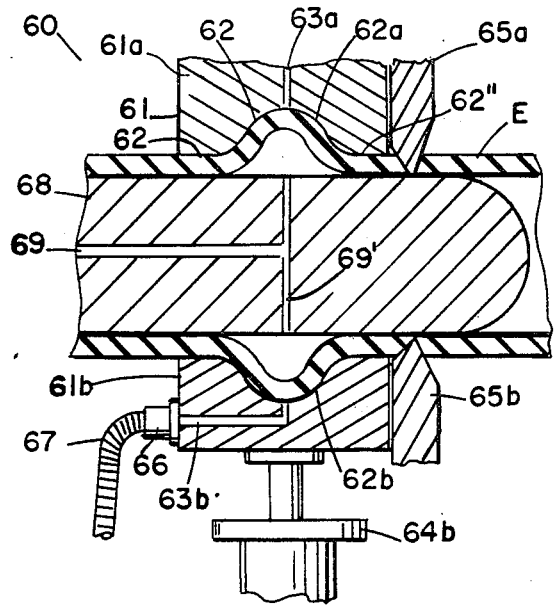
FIG. 1 is a side view with parts broken away for clarity of an apparatus for deforming an extrusion by pressure means.

In general, the instant invention is defined by apparatus for continuously forming tubular extrusions having outwardly flared or beaded wall formations provided along predetermined portions of the length of the extrusion by operating on the extrusion immediately after it is formed to shape and is still in a relatively soft and easily deformable condition. Tube deforming means are provided in which fluid pressure is varied either directly through the mandrel to effect expansion of the tubing or through the die or to auxiliary die means applied to the extrusion immediately after it has expressed from the extrusion die. While the different embodiments shown in the drawings illustrate modified forms of apparatus for effecting the deformation of a freshly tubular extrusion, it is noted that features of certain of the devices shown may be combined with the features of others of the illustrated forms to provide means for forming more complex shapes without departing from the spirit of the invention. Furthermore, while the apparatus is described as an automatic extrusion apparatus, modified forms thereof may be used to effect the described results on either previously formed tubing or tubing formed by means other than extrusion such as by continuous casting, roll forming or the like. While a freshly formed thin walled extrusion may be provided in a soft enough condition immediately after it is formed in the extrusion die, in certain instances, it may be necessary to reheat the extrusion by induction, radiation or other means prior to deforming same as described herein.

Figure 2:
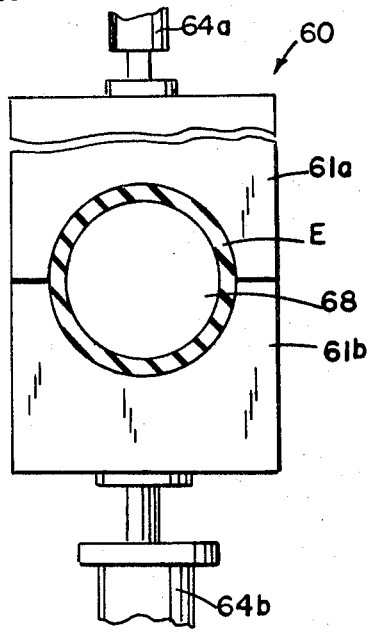

FIGS. 1 and 2 illustrate a form of the invention wherein the deforming of predetermined or selected lengths of a tubular member such as an extrusion is effected by fluid pressure means applied to selected portions of the extrusion while it is in a formable condition. The apparatus 60 illustrates a tubular extrusion E which is disposed between a pair of aligned dies 61 which are respectively denoted 61a and 61b. The extrusion E is shown disposed over a mandrel 68 which may form part of an extrusion apparatus as described or any suitable apparatus which is operative to cooperate in deforming the extrusion. The dies 61a and 61b are respectively connected to respective lineal actuators 64a and 64b such as fluid cylinders, solenoids or motors which are operative to suitably advance the dies against the extrusion prior to the forming operation and to retract same therefrom after the forming operation.

In FIGS. 1 and 2 the two dies are provided with respective cavities 62a and 62b which circumscribe the extrusion when the dies are advanced, said cavities forming an annular circumscribing depression 62 outwardly of the extrusion into which the wall of the extrusion may be deformed by fluid pressure applied either through the dies and/or through one or more passageways 69 in the mandrel 68. Passageways 63a and 63b are provided in the respective dies 61a and 61b and are each connected to source of vacuum or negative pressure by means of respective solenoid valves 66, one of which is shown mounted on the die 61b and is connected to a vacuum pump (not shown) by means of a flexible hose 67 which deflects with the radial movement of the die. In one form of operation, when the dies 61 are sealingly compressed together and advanced as shown, semicircular surfaces 62′ and 62″ on both sides of the forming cavities in the dies are forced into sealing engagement with separated portions of the extrusion E so that the die cavity 62 will be sealed against atmospheric pressure by the surface of the extrusion. Accordingly, when negative pressure is applied to said cavities, the extrusion will be drawn outwardly into the cavities 62 to deform against the surfaces of the cavity walls. Positive pressure may also be applied to the passageway 69 in the mandrel 68 and through a plurality of radial passageways 69′ extending therefrom to the surface of the mandrel in alignment with the cavities of the dies. Said positive pressure may be used per se to outwardly deform the extrusion or in cooperation with the negative pressure applied through the dies. Also shown in FIG. 1 are a pair of cutting dies 65a and 65b which may be program controlled to cut through selected portions of the extrusion against the mandrel as shown so as to provide sections of said tubing having the deformed portions E′ predeterminately located on each such section (viz: near the end).

In the event that the extrusion E is not soft enough to be thermally deformed, each of the dies 61a and 61b may be electrically heated to soften the extrusion. Other heating means may include electrically or otherwise heating the mandrel 68 or providing the fluid used to deform the extrusion at a suitable high temperature.

In the event that a hydraulic fluid is applied to the mandrel passageways 69 and 69′ to outwardly bulge the extrusion to the die cavities, said fluid may be applied as a sudden pulse and thereafter retracted back into the mandrel to prevent overflow into the interior of the extrusion by suitably operating positive and negative fluid pressure servo or valve means connected to the fluid conducting system which includes the mandrel passageway.

The described operations of deforming the tubular extrusion E may be effected while the tubing is in motion by rapidly operating the dies in a simple advance and retract stroke or by moving said dies along with the extrusion at substantially the velocity of the extrusion and retracting same thereafter prior to initiating the next deforming cycle. In a third mode of operation, suitable control means may be provided for stopping the travel of the tubular member or extrusion during the deforming operation and said control means as well as the other variables may be automatically controlled by a program controller as described.

Figure 3:
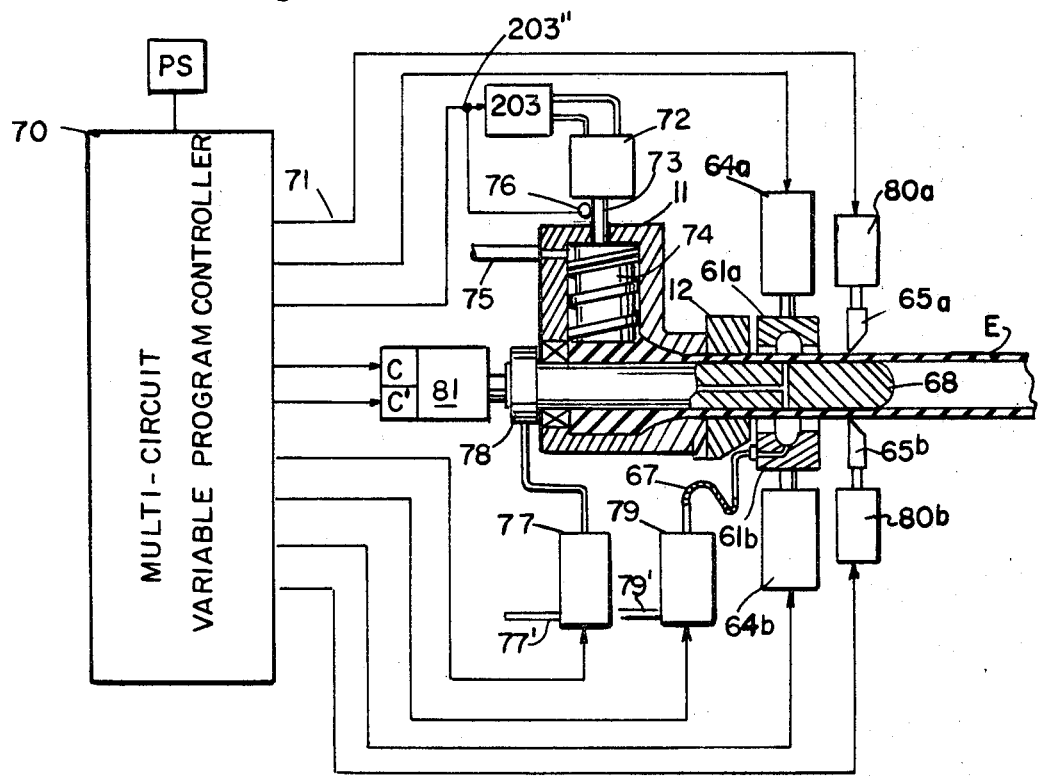
FIG. 3 is a schematic diagram illustrating a control system applicable to apparatus of the type shown in FIGS. 1 and 2 and showing both open and closed loop control means for certain of the components as particularly applied to an extrusion apparatus for forming and severing thin walled tubing.

In FIG. 3 is shown details of an automatic control system for variably controlling a tube extrusion and deforming apparatus of the type hereinbefore described. A multi-circuit program controller 70 such as a multi-circuit timer or a command signal generator may be used to operate all of the servos or valve-operating solenoids in the proper sequence so as to control not only the extrusion process but also the auxiliary apparatus necessary to effect variations in the shape of the wall of the extrusion. While in its simplest form, the controller 70 may comprise an electro-mechanical or electronic timer operative to provide electrical power for the various servos which operate the extrusion apparatus and the described wall-deforming apparatus in an open loop system, a preferable system is one in which the extrusion variables and, in certain instances, the tube-deforming means are predeterminately controlled by respective closed loop control sub-systems of the type described in application Ser. No. 142,405. Such a subsystem is illustrated in FIG. 3 as applicable for controlling the motor 72 which rotates the extrusion screw 74 to feed material from an inlet 75 connected to a supply of said material to the main extrusion chamber and outwardly through the extrusion die 12 over the mandrel 68. The control means for the extrusion material feed motor 72 includes a sub-system 203 which, as described in said parent application, includes an electric stroker which is operated by an error signal generated by a comparator device 203″ which receives analog signals from a recording reproduced from the program controller 70 and a feedback tachometer 76 driven by the shaft 73 of the controlled motor 72. The signals generated by controller 70 and tachometer 76 are bucked in the comparator device 203″ which may comprise a summing amplifier, resulting in an error or difference signal being generated at the output of 203″ which is indicative of the correction necessary in the control of motor 72 in order to make its operation conform to the command signal generated by the controller 70. The electric stroker forming part of the control sub-system 203 varies the operation of a hydraulic stroker therein in accordance with the signal received at the input to sub-system 203 while said hydraulic stroker is applied to vary the position of a slide block of a variable displacement hydraulic pump so as to vary the output of the pump and variably control the hydraulically operated motor 72 to cause the extrusion screw 74 to vary in accordance with the command control signals reproduced from the recording member of the program controller 70. Thus, the rate of flow of the extrusion E may be varied during the described operation of forming a portion of the wall thereof or even stopped during the forming operation in accordance with the signals generated on the outputs 71 of the multi-circuit controller 70.

Other devices of the types described in FIG. 2 which are automatically and sequentially controlled in a predetermined cycle by the program controller 70 include the means for operating the deforming tool or applying pressure to the mandrel or dies to deform the extrusion, rotating the mandrel and operating the cut-off means described. Notation 81 refers to a motor which is coupled to the mandrel 68 and, when operated by signals generated by controller 70, will rotate said mandrel at a predetermined speed for effecting the described tube beading, flaring, threading, machining or other deforming function. Although not illustrated, the described tooling mounted in the mandrel may also be operated to expand or project a deforming tool from the mandrel during one or more predetermined intervals in the extrusion cycle. In its place, in FIG. 3 is shown a first solenoid-operated valve 77 which controls the application of positive pressure from a source (not shown) applied to the inlet line 77′ thereof and through a rotary coupling 78 connected to the shaft of mandrel rotating motor 81 and connecting the passageway in the mandrel with the output line of the solenoid valve 77. A second solenoid-operated valve 79 connects the source of negative pressure extending to the inlet 79' thereof with a flexible line 67 extending the passageways in the vacuum forming dies 61a and 61b. Suitable signals generated on the output of program controller 70 may thus be used to control the solenoids operating valves 77 and 79 to apply positive and negative pressure against selected portions of the wall of the extrusion to deform same into the cavities in the dies 61 after said dies have been advanced by their servos 64a and 64b in response to signals generated by the controller 70 into compressive engagement with the extrusion as described. Finally, signals generated on respective outputs of the controller 70 are utilized to energize the solenoids or servos 80a and 80b advancing cut-off knives or blades 65a and 65b against the extrusion E in alignment with the mandrel so as to effect the cutting off of lengths of said extrusion in timed relationship to the operations of deforming portions of the extrusion to produce sections of extruded tubing having deformed or beaded formations provided at predetermined portions of said sections.

Other variables which may also be controlled by means of the apparatus illustrated in FIG. 3 include pumps or solenoids for operating valves to admit coating or sealing material to predetermined portions of the tubular extrusion such as those portions at which cut-off will be effected or those portions containing the deformed channel or bead formations.

It is noted that the apparatus of FIG. 3, may also be operative to predeterminately provide sealing or adhesive material along selected portions of a tubular extrusion which comprise beaded formations or channels formed in or of the wall of the extrusion or along selected non-deformed portions of the extrusion to provide, for example, sealing or bonding means when lengths of the extrusion which are severed from the main extrusion are thereafter assembled together. The solenoid or pump means 77 may be operative in response to signals generated by the multi-circuit program controller 70 to inject sealant or adhesive material from a reservoir connected to the inlet line 77' through the passageways in the mandrel 68 so as to predeterminately coat selected lengths of the inside surface of the tube extrusion formed over said mandrel. Positive pressure may be terminated when it is desired to terminate the coating or filling operation or negative pressure may be applied by properly operating the device 77 to withdraw coating material from the passageways in the mandrel to prevent coating of other portions of the inside surface of the extrusion which are not desired to receive such sealing or adhesive material.

I claim:
1. Extrusion apparatus for producing tubing of varying external diameter comprising in combination:
   (a) an extruder including a die and means for feeding extrusion material and forming said material into an elongated tubular extrusion in said die,
   (b) a mandrel supported within and extending through the opening in said die and operative to define the inside surface of said tubular extrusion,
   (c) shape-changing means operative when activated, to variably shape the extrusion and change the outside diameter thereof,
   (d) control means for said tube shape-changing means and
   (e) means for activating said control means at predetermined times during the extrusion of said material to effect predetermined variations in the shape and diameter of the extrusion which shape variations repeat cyclically along the length of said extrusion.

2. Extrusion apparatus in accordance with claim 1, including cut-off means operative to sever lengths of the extrusion from the main extrusion as it is fed from said extruder, and means for operating said cut-off means in synchronized relation to the operation of said tube shape-changing means whereby predetermined lengths of said extrusion are provided each having a predeterminately located portion thereof which varies in outside diameter from other portions thereof.

3. Extrusion apparatus in accordance with claim 1, said mandrel having a head portion at least part of said head portion capable of being outwardly and inwardly deflected, means for outwardly deflecting said deflectable portion of said mandrel to cause said mandrel to engage the inside surface of the tubular extrusion aligned therewith and to predeterminately outwardly deform the wall of the tubular extrusion to increase its outside diameter, means operative thereafter for inwardly retracting said deflectable portion of said mandrel to permit passage of the extrusion over the mandrel without deforming same, and control means for said mandrel deflecting and retracting means to operate same at predetermined times during extrusion to predeterminately outwardly deform portions of the extrusion formed in said die.

4. Apparatus in accordance with claim 3, said mandrel having a base supported within said extruder and a head disposed within the die opening, said head being formed of a plurality of segments which are joined to said base, each of said mandrel head segments being radially deflected outwardly therefrom, said control means being operative to cause said segments of said mandrel to outwardly deflect and inwardly retract during respective predetermined intervals in an extrusion cycle, the outwardly deformed predetermined portions of the tube extruded over said mandrel.

5. Apparatus in accordance with claim 1, said tube diameter-changing means including an actuator means supported by said mandrel, means for normally retracting said actuator means to clear the inside surface of the tubular extrusion formed over said mandrel, said control means being operative to cause said actuator means to protrude outwardly from said mandrel and engage and outwardly deform that portion of the extrusion aligned with said actuator means.

6. Apparatus in accordance with claim 1, including actuator means mounted within said mandrel and having a tool projectable thereby from said mandrel against the inside surface of the tubular extrusion formed on said mandrel, means for outwardly projecting said tool to change the shape of the extrusion and means for rotating said tool when said tool is projected outwardly from said mandrel so as to circumscribingly deform the wall of the extrusion.

7. Apparatus in accordance with claim 6, said actuator means comprising a solenoid, the deforming tool including the shaft of said solenoid.

8. Apparatus in accordance with claim 6, said actuator means being operated by fluid pressure, a passageway extending through said mandrel to said actuator means, and means for predeterminately applying positive and negative fluid pressure to said passageway for operating said actuator means to advance and retract during predetermined times in an extrusion cycle.

9. Apparatus in accordance with claim 1, including means for controlling the rate of extrusion of said tubular means, and means for operating said rate control means to change the extrusion rate and the speed of travel of the extrusion during the time said tube shape-changing means operates on the extrusion.

10. Apparatus in accordance with claim 9, said rate control means being operative to stop the extrusion of said tubular member during the time said tube shape-changing means operates on the extrusion.

11. Apparatus in accordance with claim 1, said extrusion shape-changing means comprising a plurality of aligned dies operative to advance and clampingly engage a portion of the extrusion, cavities formed in said dies, means for sealing said cavities against the surface of the extrusion when clampingly engaging the extrusion and means for applying negative pressure to said cavities when sealingly engaged with the extrusion to cause the portion of the extrusion aligned with the dies to bulge outwardly and deform into the die cavities.

12. Apparatus in accordance with claim 1, said shape-changing means comprising a plurality of dies aligned with said mandrel exterior of the extrusion passing over the mandrel, means for moving said dies to engage the outer surface of the extrusion and compress same against the mandrel, and means for applying positive fluid pressure through the mandrel to that portion of the extrusion aligned with the dies to outwardly deform the wall of the tubular member against the shaping surfaces of the dies.

13. A method for selectively coating tube and pipe as it is formed comprising continuously forming an elongated tubular extrusion in a die having a mandrel operative to define the inside surface of the tubular extrusion, and intermittently introducing coating materials such as sealants and adhesives through a passageway in the mandrel and out of an opening in the mandrel to coat predetermined portions of the wall of the extrusion with said coating materials.

14. An apparatus in accordance with claim 11, said mandrel extending beyond the exit end of said die, said dies being aligned with that portion of the extrusion passing over the extending portion of said mandrel and operative to clampingly engage the extrusion against the mandrel during the outward deformation of the extrusion.

15. An apparatus in accordance with claim 12, said mandrel extending beyond the exit end of said die, a passageway extending through said mandrel and terminating at a surface of said mandrel beneath the extrusion disposed over said mandrel, said fluid pressure applying means being connected to said passageway.

References Cited

UNITED STATES PATENTS

| | | | |
|---|---|---|---|
| 1,411,170 | 3/1922 | Kahn | 25—17 |
| 1,833,465 | 11/1931 | Knight et al. | 25—17 |
| 2,074,063 | 3/1937 | Putterlik | 25—17 |
| 2,497,724 | 2/1950 | Gilson et al. | 25—17 XR |
| 2,666,947 | 1/1954 | Shaw | 18—14 |
| 2,834,983 | 5/1958 | Norton. | |
| 2,948,919 | 8/1960 | Matthews | 18—14 XR |
| 3,134,832 | 5/1964 | Smith | 18—14 XR |
| 3,152,202 | 10/1964 | Murphy | 18—14 XR |
| 3,176,494 | 4/1965 | Cullen et al. | |
| 3,205,535 | 9/1965 | Niessen et al. | 18—14 X |
| 3,243,850 | 4/1966 | Zieg | 18—14 XR |
| 3,327,350 | 6/1967 | Limbach | 18—14 |

WILLIAM J. STEPHENSON, Primary Examiner

U.S. Cl. X.R.

72—62